(12) United States Patent
Wade

(10) Patent No.: US 6,515,883 B2
(45) Date of Patent: Feb. 4, 2003

(54) SINGLE-STAGE POWER CONVERTER AND AN UNINTERRUPTIBLE POWER SUPPLY USING SAME

(75) Inventor: Joseph R. Wade, Mindoro, WI (US)

(73) Assignee: Powerware Corporation, Raleigh, NC (US)

( * ) Notice: Subject to any disclaimer, the term of this patent is extended or adjusted under 35 U.S.C. 154(b) by 4 days.

(21) Appl. No.: 09/820,261

(22) Filed: Mar. 28, 2001

(65) Prior Publication Data

US 2002/0181262 A1 Dec. 5, 2002

(51) Int. Cl.[7] ................................................. H02M 7/00
(52) U.S. Cl. ........................................ 363/123; 323/222
(58) Field of Search ............................... 363/15, 16, 34, 363/123, 124, 126, 131; 323/222, 220

(56) References Cited

U.S. PATENT DOCUMENTS 5,815,386 A * 9/1998 Gordon ........................ 363/50
6,008,589 A * 12/1999 Deng et al. ............. 315/209 R
6,232,752 B1 * 5/2001 Bissell ........................ 323/225

* cited by examiner

*Primary Examiner*—Adolf Denske Berhane
(74) *Attorney, Agent, or Firm*—Leydig, Voit & Mayer, LTD

(57) ABSTRACT

Presented is a single-stage power converter topology allowing for power factor correction during operation. The topology utilizes an integration of Ćuk converter and single-ended primary inductance converter (SEPIC) topologies to provide AC-to-AC, AC-to-DC, DC-to-AC, and AC/DC-to-AC operation. Shared use of the Ćuk converter's output inductor by the SEPIC-type circuit elements provides continuous output current, typically unknown to a SEPIC converter. Application of the single-stage power converter topologies may be had in a line conditioner circuit, a battery charger circuit, and as an uninterruptible power supply (UPS).

23 Claims, 5 Drawing Sheets

SINGLE-STAGE POWER CONVERTER AND AN UNINTERRUPTIBLE POWER SUPPLY USING SAME

FIELD OF THE INVENTION

This invention relates generally to single-stage power converters, and more particularly to single-stage power converters having an AC, a DC, or an AC/DC input and providing power factor correction.

BACKGROUND OF THE INVENTION

As the number of computers and sophisticated electronics continues to grow, so to does the requirement for high-quality electric power to supply the growing demand presented by these devices. Unfortunately, the ability of electric power utilities to supply the power quality required by such equipment at the point of utilization has simply not kept up with the need for such power. As a result, there is a greatly increased need for power conversion and conditioning equipment that is capable of supplying reliable, high-quality power for use by these devices. Additionally, despite the essential role that such power conversion and conditioning equipment plays, there is increased market pressure for such equipment to be as low-cost and complexity as possible to achieve the required reliability demanded by the consuming public.

Uninterruptible power supplies (UPSs) make up one class of such power conversion and conditioning equipment in increased demand. These UPSs are needed to supply reliable high-quality power to the consumer and commercial electronics industries to maintain operation of this equipment in the face of degraded or absent utility power. A typical UPS includes power conversion circuitry capable of conditioning poor quality AC voltage from the utility line, as well as generating high-quality output power from electric storage batteries. The typical UPS utilizes a multistage power converter to fulfill all of the requirements of the UPS system. These requirements may include maintaining the charge of the electric storage batteries during AC power line usage, performing power factor correction on the input power draw from the utility line, and generating an AC output voltage from the electric storage batteries during periods of loss or sufficient degradation of the power quality of the utility line voltage. Unfortunately, such increased complexity also tends to drive up the cost of such UPS equipment.

Various single-stage power converter topologies are known in the power conversion industry. Unfortunately, most are limited to simple DC-to-DC conversion. One such single-stage power converter, which has found wide application as a DC-to-DC converter, is known as the Ćuk converter after its inventor, Dr. Slobodan Ćuk of the California Institute of Technology. This single-stage switched mode DC-to-DC converter 400 illustrated in FIG. 4 operates from a DC input voltage source 402 and delivers an output DC voltage to the connected load 416. The DC source 402 is coupled through input inductor 404 and coupled across switching device 406. The converter 400 includes capacitor 408 and diode 410, as well as an output inductor 412 and filter capacitor 414. The control and operation of the Ćuk converter 400 is well known, and has an output transfer function defined by the following equation:

$$V_{OUT} = -V_{IN} \times \frac{T_{ON}}{T_{OFF}},$$

where $T_{on}$ and $T_{off}$ are the on and off times of the switching element 406.

As will be recognized by those skilled in the art, this converter may be operated in a boost or buck fashion. As will also be recognized, the Ćuk converter 400 is inverting, that is the output voltage is of opposite polarity to the input voltage. It is of interest to note that the Ćuk converter 400 allows for a continuous input current and a continuous output current. However, limitations on this circuit require that the input voltage be equal to or greater than zero, thereby constraining its operation to applications having DC input voltages only. As such, the Ćuk converter 400 has not found applicability where AC input voltage is used.

Another switched mode single-stage power converter that has found wide applicability is the single ended primary induction converter (SEPIC) 500 as illustrated in FIG. 5. As with the Ćuk converter 400, the SEPIC converter 500 is a DC-to-DC converter. Unlike the Ćuk converter 400, the SEPIC converter 500 is non-inverting. Its output transfer function is defined by $$V_{OUT} = V_{IN} \times \frac{T_{ON}}{T_{OFF}},$$

where $T_{ON}$ and $T_{OFF}$ are the on and off times of switching element 506.

The actual construction of the SEPIC converter 500 is also very similar to the Ćuk converter, utilizing a DC input voltage source 502 coupled through an input inductor 504 across switching element 506 and across inductor 508. Unlike the Ćuk converter 400, the SEPIC converter 500 utilizes an output diode 512, coupling inductor 510 between capacitor 508 and diode 512 to ground. The output capacitor 514 is coupled in parallel with the output load 516. While the input current from the positive DC voltage source 502 may be continuous, the structure of the SEPIC converter 500 results in an output current that is discontinuous. This discontinuity in the output current tends to increase the output distortion, and further limits application of the SEPIC converter to applications that can tolerate such increased output waveform distortion. This SEPIC converter 500 is also limited to applications that have only a positive DC input voltage, therefore prohibiting its application where AC line voltage must be used.

SUMMARY OF THE INVENTION

In view of the above, it is an object of the present invention to provide a new and improved single-stage power converter. More particularly, it is an object of the present invention to provide a new and improved single-stage switched mode power converter providing power factor correction.

In one embodiment of the present invention a single-stage power converter comprises an input that receives an electric power input from an external source, a first circuit portion coupled to the input and operative during a first phase to produce an output power to an external coupled load. The converter further includes a second circuit portion coupled to the input and operative during a second phase to produce the output power. In this embodiment, the first circuit portion is configured as either a Ćuk converter or a single-ended primary inductance converter (SEPIC) and the second circuit portion is configured as either a Ćuk converter or a single-ended primary inductance converter (SEPIC). Unlike a typical SEPIC converter, the output power produced by each of the first and the second circuit portions is continuous.

In an embodiment of the present invention, the first circuit portion includes an output inductor through which the output power is supplied during the first phase. The second circuit portion shares this output inductor. For an embodiment where the input electric power is AC and the output electric power is DC, the first circuit portion is configured as a Ćuk converter and the second portion is configured as a SEPIC converter. In this embodiment the first circuit portion is operative during a negative half-cycle of the AC input electric power, and the second circuit portion is operative during a positive half-cycle of the AC input electric power.

For an embodiment where the input electric power is AC and the output electric power is also AC, the first circuit portion is configured as a Ćuk converter and the second circuit portion is also configured as a Ćuk converter. The first circuit portion is operative during a positive half-cycle of the AC input electric power, and the second circuit portion is operative during a negative half-cycle of the AC input electric power. With this embodiment the output electric power is inverted relative to the input electric power.

For an embodiment where the input electric power is AC and the output electric power is AC, the first circuit portion is configured as a SEPIC converter and the second circuit portion is also configured as a SEPIC converter. In this embodiment the first circuit portion is operative during a positive half-cycle of the AC input electric power, and the second circuit portion is operative during a negative half-cycle of the AC input electric power. The output electric power is non-inverted relative to the input electric power.

For and embodiment where the input electric power is DC and the output electric power is AC, the first circuit portion is configured as a Ćuk converter and the second circuit portion is configured as a SEPIC converter. In this embodiment the first circuit portion is operative to construct a negative half-cycle of the AC output electric power, and the second circuit portion is operative to construct a positive half-cycle of the AC output electric power.

In a further embodiment of the present invention, the converter further comprises a third circuit portion coupled to the input and operative during a third phase of operation to produce the output power. The third circuit portion is configured as one of a Ćuk converter and a single-ended primary inductance converter (SEPIC) sharing the output inductor through which the output power is supplied. In this embodiment, at least one of the first, second, and third circuit portions is configured as a Ćuk converter and at least one other of the first, the second, and the third circuit portions is configured as a SEPIC converter.

Preferably in this embodiment the input is adapted to selectively receive an electric power input from a first external source of DC electric power and a second external source of AC electric power. When the input receives the electric power input form the first external source of DC electric power and when the output electric power is AC, the first circuit portion is configured as a Ćuk converter and the second circuit portion is configured as a SEPIC converter. In this configuration the first circuit portion is operative to construct a negative half-cycle of the AC output electric power. The second circuit portion is operative to construct a positive half-cycle of the AC output electric power.

In this embodiment when the input receives the electric power input form the second external source of AC electric power and when the output electric power is AC, the second circuit portion is configured as a SEPIC converter and the third circuit portion is also configured as a SEPIC converter. In this configuration, the second circuit portion is operative to construct a positive half-cycle of the AC output electric power, and the third circuit portion is operative to construct a negative half-cycle of the AC output electric power.

In an alternate embodiment a single-stage AC-to-AC converter comprises an input adapted to receive AC electric power from an external source and a first circuit portion. This first circuit portion forms a first Ćuk converter having an input inductor, an output inductor, and a line capacitor. The AC-to-AC converter also includes a second circuit portion forming, in conjunction with the input inductor, the output inductor, and the line capacitor, a second Ćuk converter. This second Ćuk converter is oriented in opposite polarity to the first Ćuk converter. Preferably, the first Ćuk converter is operative during a positive half-cycle of the AC electric power from the external source to generate a negative half-cycle of an output AC electric power. The second Ćuk converter is operative during a negative half-cycle of the AC electric power from the external source to generate a positive half-cycle of the output AC electric power.

In one embodiment, the first Ćuk converter includes a first power switching device and a first series connected diode. Likewise, the second Ćuk converter includes a second power switching device and a second series connected diode. The first power switching device and the first series connected diode are coupled in opposite parallel orientation to the second power switching device and the second series connected diode.

In a further embodiment, a single-stage AC-to-DC converter is presented comprising a first circuit portion forming a Ćuk converter having an input inductor and an output inductor, and a second circuit portion forming, in conjunction with the input inductor of the Ćuk converter, a single-ended primary inductance converter (SEPIC). The SEPIC converter is coupled to the output inductor of the Ćuk converter to maintain a constant output current during operation of the SEPIC converter. Further, the SEPIC converter is oriented in opposite polarity to the Ćuk converter.

Preferably, reverse power flow through the first circuit portion and the second circuit portion is prohibited by blocking diodes. Additionally, in one embodiment the first circuit portion is operative during a negative half-cycle of the AC electric power to produce a positive DC output, and the second circuit portion is operative during a positive half-cycle of the AC electric power to produce a positive DC output. The shared output inductor ensures constant output current during operation of the second circuit portion.

In a further embodiment of the present invention, an uninterruptible power supply (UPS) operative to supply AC output power to connected loads from both AC line power and backup DC battery power in the event of loss or severe degradation of AC line power is presented. This UPS comprises input source selection circuitry that is adapted to receive the AC line power and the backup DC battery power. The UPS also includes a first circuit portion forming a Ćuk converter having an input inductor and an output inductor. A second circuit portion is included that forms, in conjunction with the input inductor of the Ćuk converter, a first single-ended primary inductance converter (SEPIC). The first SEPIC converter is also coupled to the output inductor of the Ćuk converter to maintain a constant output current during operation of the first SEPIC converter. This first SEPIC converter is oriented in opposite polarity to the Ćuk converter. A third circuit portion is also included. This third circuit portion forms, in conjunction with the input inductor of the Ćuk converter, a second single-ended primary inductance converter (SEPIC). The second SEPIC converter is also coupled to the output inductor of the Ćuk converter to maintain a constant output current during operation. This second SEPIC converter is oriented in like polarity to the Ćuk converter.

In this embodiment when the input source selection circuitry selects the AC line power, the second SEPIC converter is operative during a positive half-cycle of the AC line power to produce a positive half-cycle of the AC output power through the shared output inductor of the Ćuk converter. The first SEPIC converter is then operative during a negative half-cycle of the AC line power to produce a negative half-cycle of the AC output power through the shared output inductor of the Ćuk converter. When the input source selection circuitry selects the backup DC battery power, the second SEPIC converter is operative to produce a positive half-cycle of the AC output power through the shared output inductor of the Ćuk converter. The Ćuk converter is then operative to produce a negative half-cycle of the AC output power.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
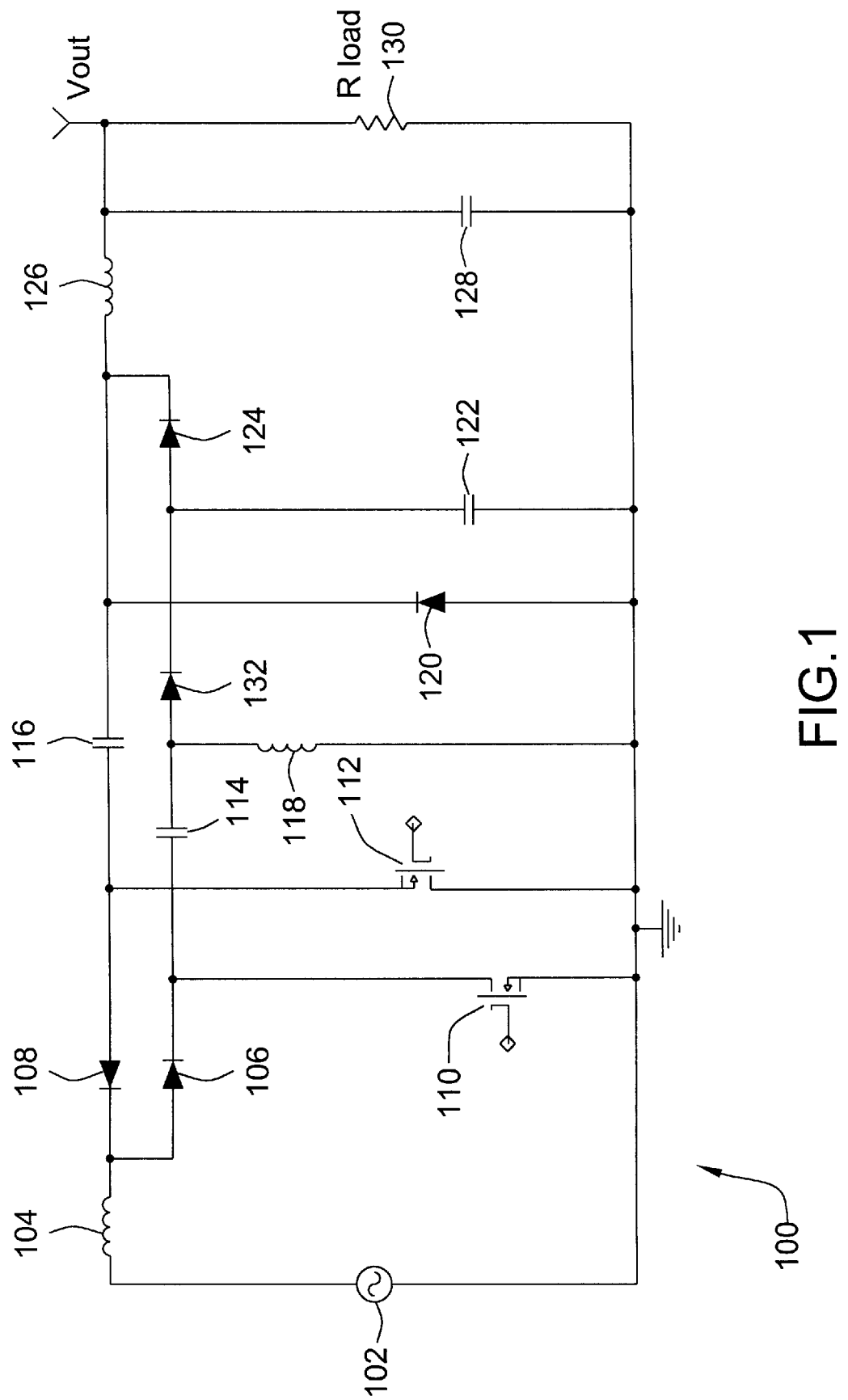
FIG. 1 is a simplified single line schematic diagram illustrating an embodiment of an AC-to-DC single-stage power converter having power factor correction constructed in accordance with the teachings of the present invention.

An embodiment of a single-stage power converter having an AC input in accordance with the present invention is illustrated in FIG. 1. In this embodiment of the present invention, the single-stage converter 100 utilizes an AC input 102 that may be from, for example, a utility line input voltage. This single-stage converter 100 produces a DC output to be used by the connected load 130. In addition to this converter's applicability as a DC power supply, it is also particularly applicable to battery charging applications for use, for example, in uninterruptible power supplies (UPSs). In such an application, the utility line voltage is used to maintain a charge on the batteries in the UPS so that, upon a loss of the utility line voltage or a degradation in the power quality, the batteries are of sufficient charge to maintain the power supply to critical electronic equipment.

Figure 5:
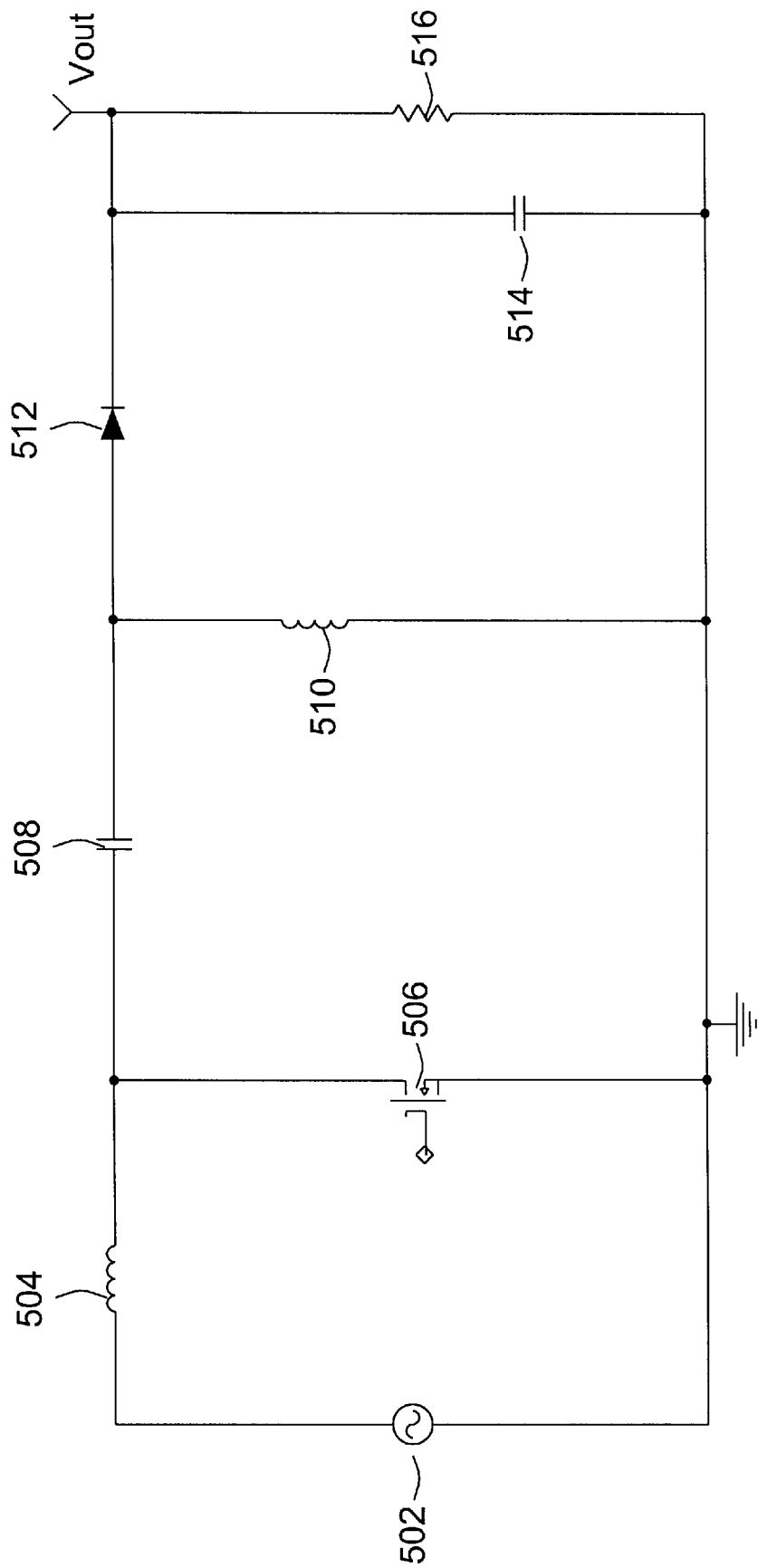
FIG. 5 is a simplified single line schematic diagram of a typical single-ended primary inductance converter (SEPIC).

Operation of converter 100 during the positive half-cycle of the input AC voltage source 102 proceeds with power flow through input inductor 104, diode 106, capacitor 114, inductor 118, diode 132, capacitor 122, diode 124, output inductor 126, capacitor 128, and load 130. The control of the output voltage generation is accomplished by control of switching element 110 during this positive half-cycle. As will be recognized by those skilled in the art, the power flow circuitry during this positive half-cycle of the AC input voltage utilize components constructed similarly to a SEPIC converter as discussed above with regard to FIG. 5. As such, the output transfer function of the converter 100 during the positive half-cycle of the input AC voltage source 102 is governed by $$V_{OUT} = V_{IN} \times \frac{T_{ON}}{T_{OFF}}.$$

However, unlike the typical SEPIC converter illustrated and discussed above with regard to FIG. 5, the converter 100 illustrated in FIG. 1 has a continuous output current during this positive half-cycle. As will be recalled, the typical SEPIC converter has a discontinuous output current which significantly adds to the output waveform distortion, and renders the application of such topology inappropriate for many applications that require low harmonic distortion on the output. However, converter 100 overcomes this problem through the use of the shared output inductor 126. This provides a significant advantage, enabling the application of the simple single-stage SEPIC type topology in applications that require low output harmonic distortion.

Steering diodes 106 and 124 also provide protection to the SEPIC type circuitry during the negative half-cycle of the input AC voltage source 102. As discussed above with regard to the typical SEPIC converter illustrated in FIG. 5, this circuitry absolutely required that the input voltage source be positive. While such a requirement is not a problem in applications that utilize a DC voltage, such requirement absolutely precluded the use of this topology converter in applications that utilized voltage sources that could become negative. In the embodiment of the present invention illustrated in FIG. 1, steering diodes 106 and 124 block the negative voltage from being impressed across the circuit elements of the SEPIC type circuitry, and therefore prevent any reverse voltage damage to switching element 110.

Figure 4:
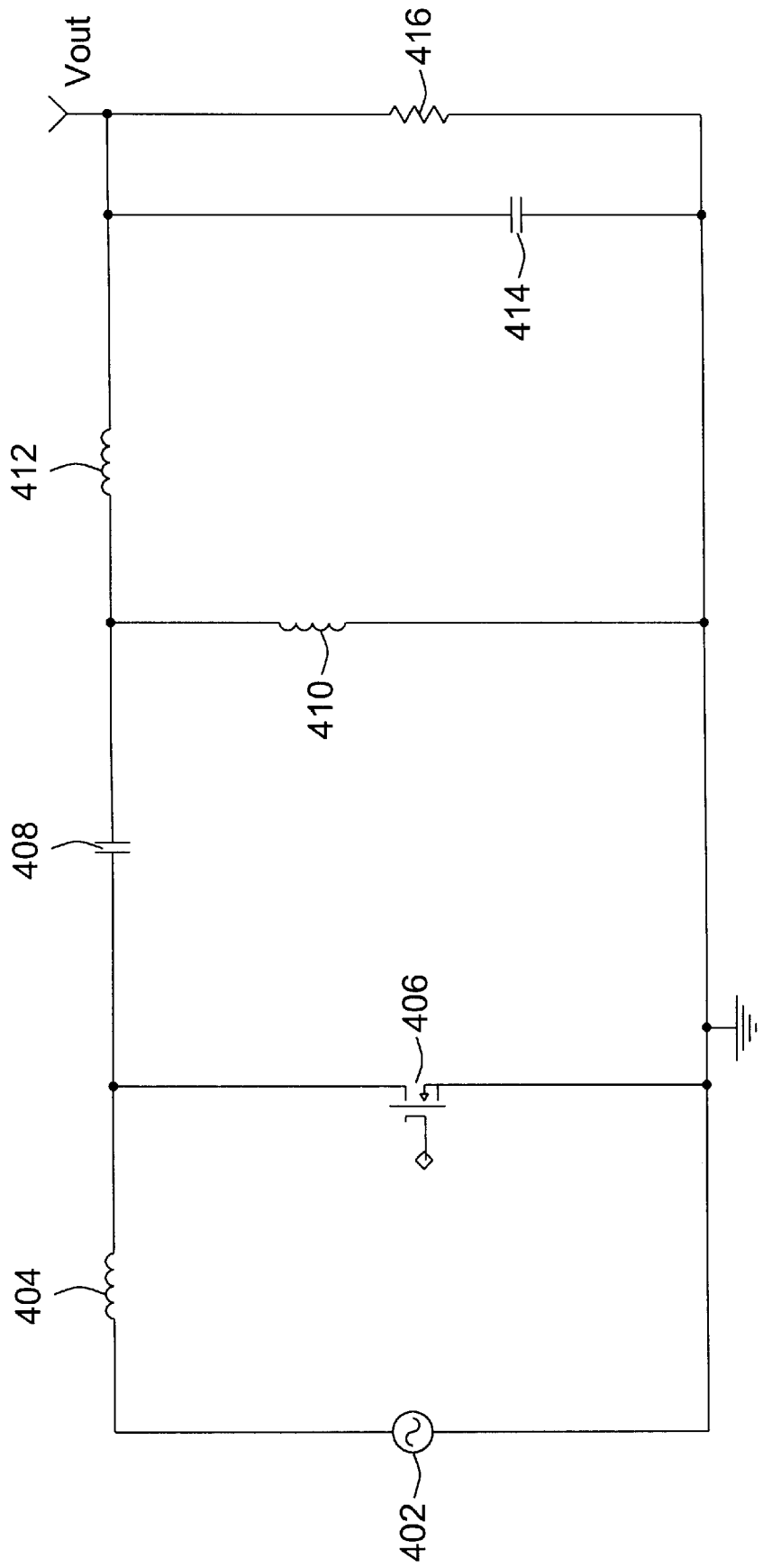
FIG. 4 is a simplified single line schematic diagram of a typical Ćuk switched mode power converter.

During the negative half-cycle of the input AC voltage source 102, the power flow in converter 100 utilizes the inductor 104, diode 108, capacitor 116, diode 120, output inductor 126, filter capacitor 128, and output load 130. The control of the output voltage is accomplished through switching element 112. As will be recognized by those skilled in the art from the above discussion, during this phase of converter 100 operation, a single-stage topology similar to the Ćuk converter discussed above with regard to FIG. 4 is realized. However, unlike the typical Ćuk converter that requires a positive input voltage, the configuration of switching element 112 and diode 120 enable operation with the negative input voltage from source 102. As with the typical Ćuk converter, the output transfer function during this phase of operation is governed by $$V_{OUT} = -V_{IN} \times \frac{T_{ON}}{T_{OFF}}.$$

That is, the transfer function is inverting, resulting in the generation of a positive output DC voltage. This, in combination with the non-inverting transfer function of the circuitry utilized during the positive half-cycle of voltage source 102 results in the output generation of a positive DC voltage.

The overall transfer function, therefore, of converter 100 is as follows:

$$V_{OUT} = \mathrm{ABS}\left[V_{IN} \times \frac{T_{ON}}{T_{OFF}}\right].$$

That is, the converter 100 provides a rectification of the input AC voltage source 102 to generate a regulated output DC voltage to the connected load 130. As with steering diodes 106, 124, steering diode 108 provides protection of switching element 112 from reverse voltage damage.

Advantageously, converter 100 utilizes a continuous input current and generates a continuous output current, thereby minimizing the distortion induced on the line and Venerated at the output. This allows the increased applicability for applications that cannot tolerate the inducement or generation of high harmonic distortion caused by discontinuous current flow. Indeed, the switching elements 110, 112 may utilize typical power factor correction control methodologies to ensure that the current draw from source 102 is in phase with the voltage waveform to provide power factor correction in this single-stage AC-to-DC converter 100. This provides improved power efficiency and reduced cost over the typical multistage converters required when an AC input is to be used.

Further, any switched mode control methodology may be utilized to control this converter 100, including a constant on time, constant off time, constant frequency duty cycle control, hysteretic current loop control, etc. Further, the control may be used with or without inner current loop control and/or feedback. As such, its operation is very robust and may be applied in applications that require advanced, sophisticated control or in applications that are driven to a very simplified control.

Figure 2:
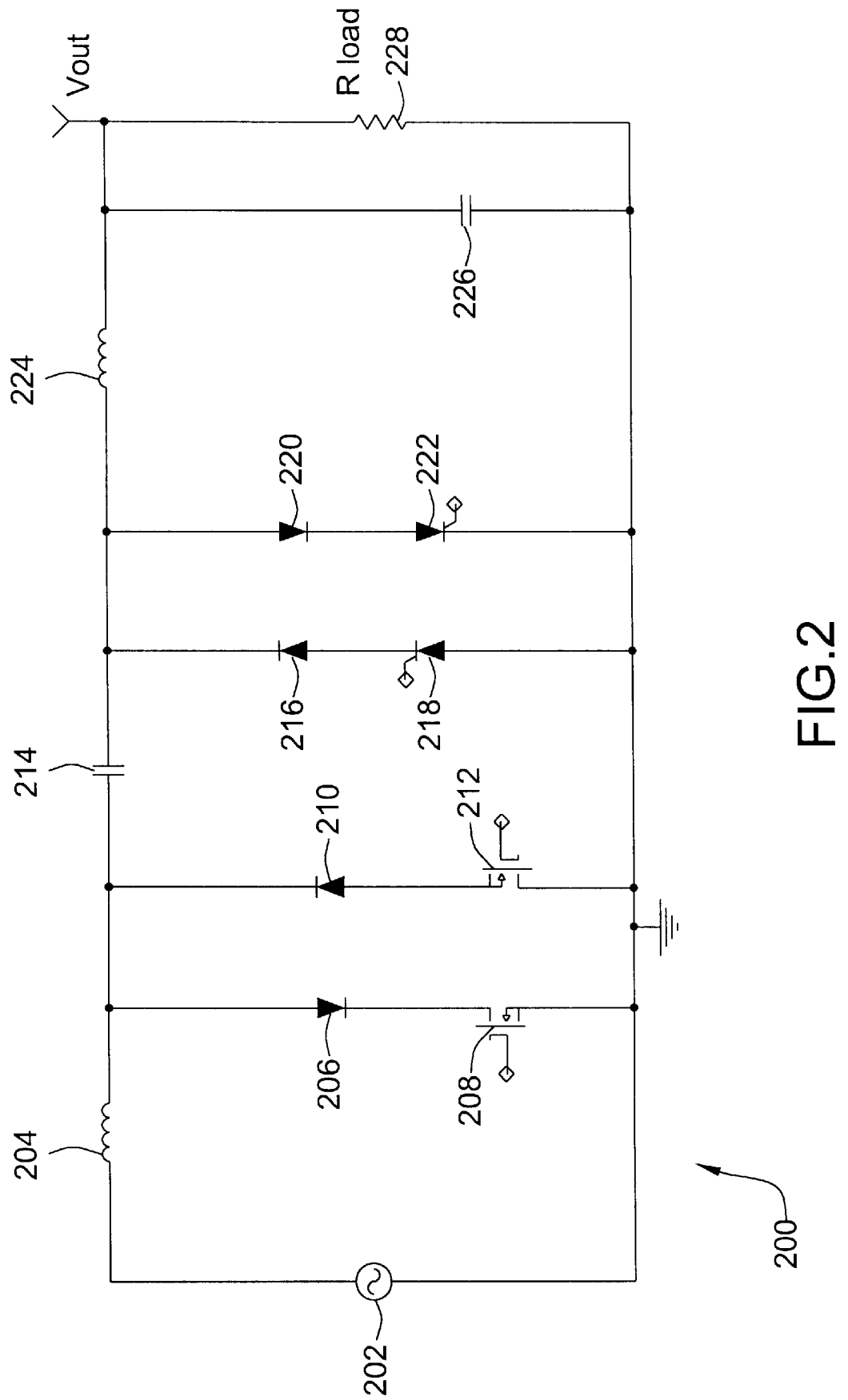
FIG. 2 is a simplified single line schematic diagram illustrating an embodiment of an AC-to-AC single-stage power converter having power factor correction constructed in accordance with the teachings of the present invention.

An alternate embodiment of a single-stage power converter having an AC input in accordance with the teachings of the present invention is illustrated in FIG. 2. In this embodiment, the converter 200 utilizes an AC input voltage source 202 and generates an output AC voltage for the load 228. As such, this single-stage power converter 200 acts as a line conditioner, providing a constant output power quality regardless of the distortions that may be present from the input power source 202.

During the positive half-cycle of the AC line voltage source 202, power flow through converter 200 utilizes the input inductor 204, capacitor 214, diode 220, and silicon controlled rectifier (SCR) 222, output inductor 224, and output filter capacitor 226. The control of the output voltage generation takes place through the diode 206 and switching element 208. As will be recognized by those skilled in the art, this configuration approximates a Ćuk converter topology with the addition of diode 206 and SCR 222. As such, the output voltage delivered to the load 228 is inverted from that of the input voltage source 202. As with the typical Ćuk converter, the output transfer function during this positive half-cycle of the input voltage is $$V_{OUT} = -V_{IN} \times \frac{T_{ON}}{T_{OFF}}.$$

Diode 210 serves to protect switching element 212 from a reverse voltage condition.

During the negative half-cycle of the input voltage source 202, power flow through converter 220 proceeds through the same shared input 204 and output 224 inductors and through capacitor 214 and 226, but now utilizes the diode 216 and the SCR 218. Likewise, the control of the output voltage generation during this negative half-cycle of the input voltage is controlled through diode 210 and switching element 212. As with the circuit elements utilized during the positive half-cycle of the input voltage waveform, during the negative half-cycle the converter 200 topology approximates a reverse Ćuk converter. As such, the output voltage generated across load 228 is also inverted from the input voltage waveform, and is governed by the output transfer function $$V_{OUT} = -V_{IN} \times \frac{T_{ON}}{T_{OFF}}.$$

During this half-cycle, diode 206 protects switching element 208 from a reverse voltage condition.

As is apparent from the foregoing discussion, this embodiment of the present invention utilizes shared input and output inductors, 204 and 224, respectively. In this way, both the input and the output current are continuous, even during transitions through the zero cross of the input voltage waveform. Additionally, switching elements 208 and 212 may be controlled in a known manner to provide power factor correction by ensuring that the power draw from the voltage source 202 is in phase with the voltage waveform. As such, this converter 200 provides an improved power efficiency and reduced cost over prior multistage converters. Further, this simple single-stage topology enables the utilization of known switched mode control methods such as constant on time, constant off time, constant frequency duty cycle control, hysteretic current loop control, etc. Further, the control may operate with or without inner current loop feedback.

Figure 3:
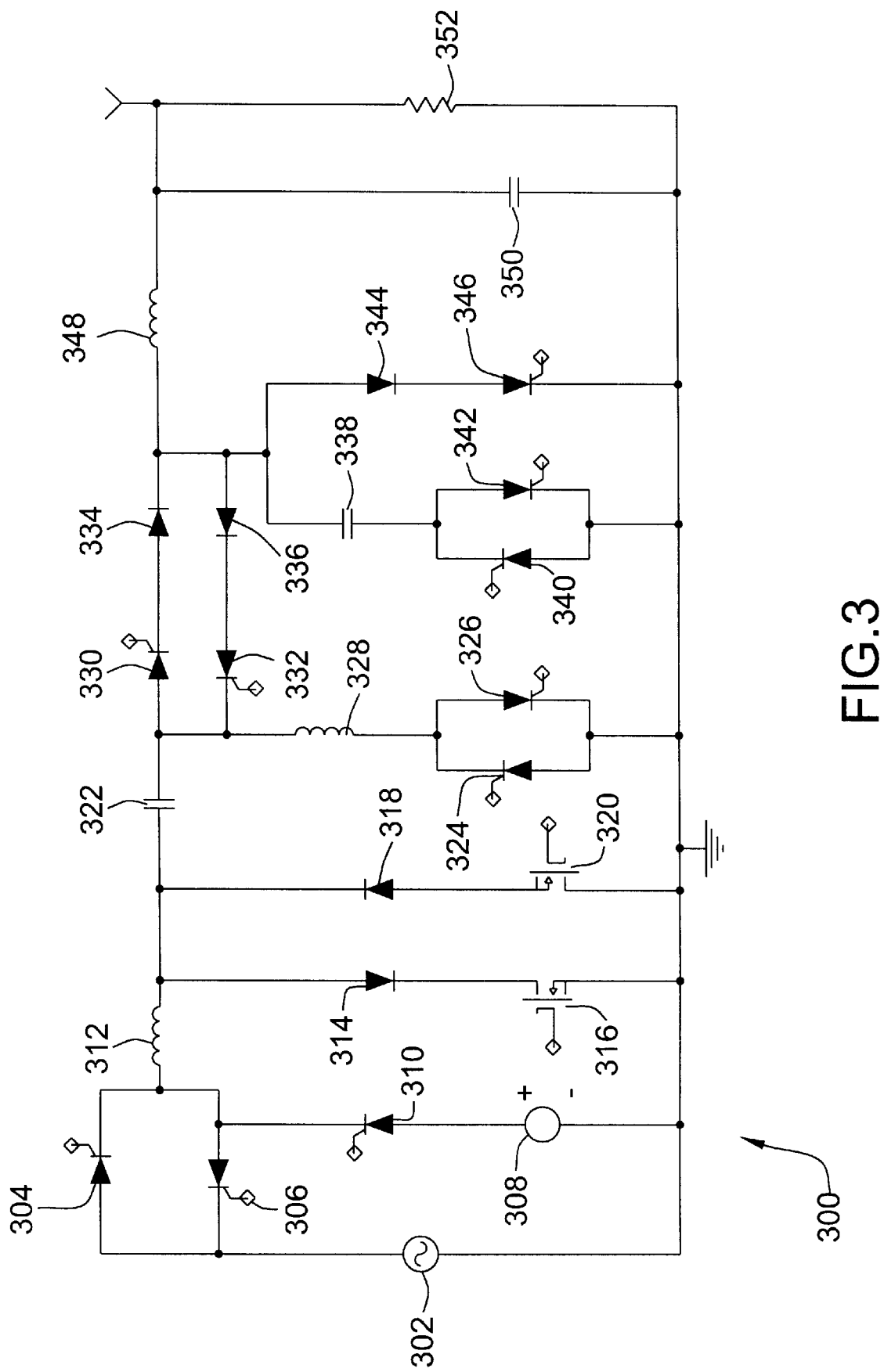
FIG. 3 is a simplified single line schematic diagram illustrating an embodiment of an DC-to-AC or AC-to-AC single-stage power converter having power factor correction constructed in accordance with the teachings of the present invention.

If the single-stage converter of the present invention were to be used in an uninterruptible power supply application requiring both AC and DC inputs to generate an AC output, the embodiment of the invention illustrated in FIG. 3 may be used. This embodiment of a single-stage converter 300 may operate from both an AC voltage source 302 and a battery source or other source of DC power 308 to generate an output AC voltage for the connected load 352. As will become apparent from the following discussion of this embodiment 300, the topology utilized to achieve single-stage AC/DC to AC conversion approximates a double SEPIC/single Ćuk converter.

Such a topology allows an output transfer function that does not invert the AC line voltage during the AC power phase of operation, and therefore allows an additional phase of bypass operation to be included in the UPS design. Specifically, if the input power from the utility source 302 is of sufficient quality to be supplied directly to the load 352, the converter 300 operates to supply the line voltage directly to the load 352 without additional conversion. This is accomplished by gating SCRs 304, 306, 330, and 332 on during appropriate half-cycles of the voltage input source 302. In this way, a high efficiency bypass mode of operation may be accomplished whereby no additional conditioning of the input voltage is accomplished to minimize circuit loss and increase efficiency.

While operating in a bypass mode of operation, the converter 300 may begin power conditioning upon sensing a loss of power quality of the input power from source 302 by controlling switching elements 316, 320, and gating appropriate SCRs 304, 306, 324, 326, 340, 342, and 330, 332. While using this AC input source 302 in this phase of operation, SCRs 346 and 310 are not gated into conduction. During the positive half-cycle of the AC input source 302, power flow uses SCR 304, input inductor 312, capacitor 322, inductor 328, anti-parallel connected SCRs 324 and 326, SCR 330, diode 334, capacitor 338, anti-parallel connected SCRs 340 and 342, output inductor 348, and output filter capacitor 350.

As discussed briefly above, the usage of the shared output inductor 348 allows for this SEPIC type configuration to have a continuous output current, thereby extending the applicability of this embodiment 300 to applications requiring continuous output current and low harmonic distortion. The control of the output voltage waveform generation is accomplished through diode 314 and switching element 3 16. Diode 318 serves to protect switching element 320 from a reverse voltage condition during this positive half-cycle.

During the negative half-cycle of the input AC voltage source 302, power flow uses SCR 306, input inductor 312, capacitor 322, inductor 328, anti-parallel coupled SCRs 324 and 326, SCR 332, diode 336, capacitor 338, anti-parallel connected SCRs 340 and 342, output inductor 348, and output filter capacitor 350. Control of the voltage output generation is accomplished through diode 318 and switching element 320. Diode 314 is utilized to protect switching element 316 from a reverse voltage condition during this negative half-cycle. As with operation during the positive half-cycle of the input voltage waveform, the usage of the output inductor 348 ensures a continuous output current flow to load 352 which otherwise would be impossible with the SEPIC type topology utilized. As discussed above, this allows for the usage of this topology in applications that require a continuous output current and low harmonic distortion.

As indicated above, the embodiment of the present invention 300 may also use a DC voltage input, for example, from battery 308. Such operation may be required in situations where the input AC voltage source 302 is unavailable, or is of such a poor power quality that the generation of an output of sufficient quality cannot be maintained by using this AC input source 302. To allow such operation in a single-stage converter 300, the SCRs 304, 306 are not gated into conduction, while SCR 310 is. The power flow from the DC voltage source 308 to construct an output positive half-cycle of the generated AC waveform utilizes the SCR 310, input inductor 312, capacitor 322, inductor 328, anti-parallel coupled SCRs 324, 326, SCR 330, diode 334, output inductor 348, and output capacitor 350. Control of the output voltage waveform generation is accomplished through diode 314 and switching element 316. As will be recognized by one skilled in the art, the topology of the circuit during this phase of operation approximates a SEPIC type converter having a non-inverting transfer characteristic.

To generate the negative half-cycle of the output AC waveform from the input DC source 308, the power flow uses SCR 3 10, inductor 312, capacitor 322, SCR 332, diode 336, output inductor 348, and output filter capacitor 350. As will be recognized, the topology during this phase of operation approximates a Ćuk converter having an inverting power transfer characteristic. As such, the output to the connected load 352 will form the negative half-cycle of the output waveform controlled by switching element 316.

As will now be understood, operation of the single-stage converter 300 approximates a SEPIC/SEPIC type converter when the input is to be derived from the AC voltage source 302. Further the operation approximates a SEPIC/Ćuk converter when the output AC voltage is to be generated from the input DC voltage source 308. However, even during operation in the SEPIC type configuration, the converter 300 of the present invention utilizes a shared output inductor 348 required by the Ćuk converter topology to maintain a continuous output current. This provides a significant advantage over the typical SEPIC topology converter in that the output harmonic distortion is greatly decreased.

As with the prior embodiments of the present invention, power factor correction can be accomplished through appropriate control of switching elements 316 and 320 by maintaining the input current draw in phase with the input current voltage during AC line voltage operation from source 302. This provides improved power efficiency and reduced cost over the typical multistage converters required when input AC voltage is to be utilized. Likewise, converter 300 may be operated with any known switched mode control method, including constant on time, constant off time, constant frequency duty cycle control, hysteretic current loop control, etc. Further, any of these control methods can be used with or without inner current loop feedback. The control of the gating of the various SCRs utilized in converter 300 for the operating modes discussed above is illustrated in the following truth table:

| Component No. | AC-to-AC +cycle | AC-to-AC –cycle | DC-to-AC +cycle | DC-to-AC –cycle |
| --- | --- | --- | --- | --- |
| 304, 306 | ON | ON | OFF | OFF |
| 310 | OFF | OFF | ON | ON |
| 316, 320 | PWM | PWM | PWM | PWM |
| 324, 326 | ON | ON | ON | OFF |
| 340, 342 | ON | ON | ON | OFF |
| 332 | OFF | ON | OFF | ON |
| 330 | ON | OFF | ON | ON |
| 346 | OFF | OFF | OFF | ON |

The foregoing description of various preferred embodiments of the invention has been presented for purposes of illustration and description. It is not intended to be exhaustive or to it the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A single-stage power converter, comprising:
   an input adapted to receive an electric power input from an external source of electric power;
   a first circuit portion coupled to said input, said first circuit portion operative during a first phase of operation to produce an output power to an external coupled load;
   a second circuit portion coupled to said input, said second circuit portion operative during a second phase of operation to produce said output power to the external coupled load; and
   wherein said first circuit portion is configured as one of a Ćuk converter and a single-ended primary inductance converter (SEPIC) and said second circuit portion is configured as one of a Ćuk converter and a single-ended primary inductance converter (SEPIC); and
   wherein said output power produced by each of said first and said second circuit portions is continuous.

2. The converter of claim 1, wherein said first circuit portion includes an output inductor through which said output power is supplied during said first phase, and wherein said second circuit portion shares said output inductor through which said output power is supplied during said second phase.

3. The converter of claim 2, wherein the input electric power is AC, the output electric power is DC, and wherein said first circuit portion is configured as a Ćuk converter and said second portion is configured as a SEPIC converter.

4. The converter of claim 3, wherein said first circuit portion is operative during a negative half-cycle of the AC input electric power, and wherein said second circuit portion is operative during a positive half-cycle of the AC input electric power.

5. The converter of claim 2, wherein the input electric power is AC, the output electric power is AC, and said first circuit portion is configured as a Ćuk converter and wherein said second circuit portion is configured as a Ćuk converter.

6. The converter of claim 5, wherein said first circuit portion is operative during a positive half-cycle of the AC input electric power, and wherein said second circuit portion is operative during a negative half-cycle of the AC input electric power, and wherein the output electric power is inverted relative to the input electric power.

7. The converter of claim 2, wherein the input electric power is AC, the output electric power is AC, and said first circuit portion is configured as a SEPIC converter and wherein said second circuit portion is configured as a SEPIC converter.

8. The converter of claim 7, wherein said first circuit portion is operative during a positive half-cycle of the AC input electric power, and wherein said second circuit portion is operative during a negative half-cycle of the AC input electric power, and wherein the output electric power is non-inverted relative to the input electric power.

9. The converter of claim 2, wherein the input electric power is DC, the output electric power is AC, and said first circuit portion is configured as a Ćuk converter and wherein said second circuit portion is configured as a SEPIC converter.

10. The converter of claim 9, wherein said first circuit portion is operative to construct a negative half-cycle of the AC output electric power, and wherein said second circuit portion is operative to construct a positive half-cycle of the AC output electric power.

11. A single-stage power converter, comprising:
    an input adapted to receive an electric power input from an external source of electric power;
    a first circuit portion coupled to said input, said first circuit portion operative during a first phase of operation to produce an output power to an external coupled load;
    a second circuit portion coupled to said input, said second circuit portion operative during a second phase of operation to produce said output power to the external coupled load; and
    wherein said first circuit portion is configured as one of a Ćuk converter and a single-ended primary inductance converter (SEPIC) and said second circuit portion is configured as one of a Ćuk converter and a single-ended primary inductance converter (SEPIC);
    wherein said output power produced by each of said first and said second circuit portions is continuous;
    wherein said first circuit portion includes an output inductor through which said output power is supplied during said first phase, and wherein said second circuit portion shares said output inductor through which said output power is supplied during said second phase; and
    a third circuit portion coupled to said input, said third circuit portion operative during a third phase of operation to produce said output power to the external coupled load, said third circuit portion is configured as one of a Ćuk converter and a single-ended primary inductance converter (SEPIC), and wherein said third circuit portion shares said output inductor through which said output power is supplied during said third phase, and wherein at least one of said first, second, and third circuit portions is configured as a Ćuk converter and at least one other of said first, said second, and said third circuit portions is configured as a SEPIC converter.

12. The converter of claim 11, wherein said input is further adapted to selectively receive an electric power input from a first external source of DC electric power and a second external source of AC electric power.

13. The converter of claim 12, wherein said input receives the electric power input form the first external source of DC electric power, wherein the output electric power is AC, and wherein said first circuit portion is configured as a Ćuk converter and said second circuit portion is configured as a SEPIC converter, and wherein said first circuit portion is operative to construct a negative half-cycle of the AC output electric power, and wherein said second circuit portion is operative to construct a positive half-cycle of the AC output electric power.

14. The converter of claim 12, wherein said input receives the electric power input form the second external source of AC electric power, wherein the output electric power is AC, and wherein said second circuit portion is configured as a SEPIC converter and said third circuit portion is configured as a SEPIC converter, and wherein said second circuit portion is operative to construct a positive half-cycle of the AC output electric power, and wherein said third circuit portion is operative to construct, a negative half-cycle of the AC output electric power.

15. A single-stage AC-to-AC converter, comprising:
an input adapted to receive AC electric power from an external source;
a first circuit portion forming a first Ćuk converter having an input inductor, an output inductor, and a line capacitor; and
a second circuit portion forming, in conjunction with said input inductor, said output inductor, and said line capacitor, a second Ćuk converter, said second Ćuk converter being oriented in opposite polarity to said first Ćuk converter.

16. The converter of claim 15, wherein said first Ćuk converter is operative during a positive half-cycle of the AC electric power from the external source to generate a negative half-cycle of an output AC electric power, and wherein said second Ćuk converter is operative during a negative half-cycle of the AC electric power from the external source to generate a positive half-cycle of the output AC electric power.

17. The converter of claim 15, wherein said first Ćuk converter includes a first power switching device and a first series connected diode and said second Ćuk converter includes a second power switching device and a second series connected diode, said first power switching device and said first series connected diode coupled in opposite parallel orientation to said second power switching device and said second series connected diode.

18. A single-stage AC-to-DC converter, comprising:
an input adapted to receive AC electric power from an external source;
a first circuit portion forming a Ćuk converter having an input inductor and an output inductor; and
a second circuit portion forming, in conjunction with said input inductor of said Ćuk converter, a single-ended primary inductance converter (SEPIC), said SEPIC converter being coupled to said output inductor of said Ćuk converter to maintain a constant output current during operation of said SEPIC converter, said SEPIC converter further being oriented in opposite polarity to said Ćuk converter.

19. The converter of claim 18, wherein reverse power flow through said first circuit portion and said second circuit portion is prohibited by blocking diodes.

20. The converter of claim 18, wherein said first circuit portion is operative during a negative half-cycle of the AC electric power to produce a positive DC output, and wherein said second circuit portion is operative during a positive half-cycle of the AC electric power to produce a positive DC output, said shared output inductor ensuring constant output current during operation of said second circuit portion.

21. An uninterruptible power supply (UPS) operative to supply AC output power to connected loads from both AC line power, and backup DC battery power in the event of loss or severe degradation of AC line power, comprising:
input source selection circuitry adapted to receive the AC line power and the backup DC battery power;
a first circuit portion forming a Ćuk converter having an input inductor and an output inductor; and
a second circuit portion forming, in conjunction with said input inductor of said Ćuk converter, a first single-ended primary inductance converter (SEPIC), said first SEPIC converter being coupled to said output inductor of said Ćuk converter to maintain a constant output current during operation of said first SEPIC converter, said first SEPIC converter further being oriented in opposite polarity to said Ćuk converter; and a third circuit portion forming, in conjunction with said input inductor of said Ćuk converter, a second single-ended primary inductance converter (SEPIC), said second SEPIC converter being coupled to said output inductor of said Ćuk converter to maintain a constant output current during operation of said second SEPIC converter, said second SEPIC converter further being oriented in like polarity to said Ćuk converter.

22. The UPS of claim 21, wherein said input source selection circuitry selects the AC line power, wherein said second SEPIC converter is operative during a positive half-cycle of the AC line power to produce a positive half-cycle of the AC output power through said shared output inductor of said Ćuk converter, and wherein said first SEPIC converter is operative during a negative half-cycle of the AC line power to produce a negative half-cycle of the AC output power through said shared output inductor of said Ćuk converter.

23. The UPS of claim 21, wherein said input source selection circuitry selects the backup DC battery power, wherein said second SEPIC converter is operative to produce a positive half-cycle of the AC output power through said shared output inductor of said Ćuk converter, and wherein said Ćuk converter is operative to produce a negative half-cycle of the AC output power.

* * * * *